April 22, 1969  A. H. TURNER  3,440,084
SIMULTANEOUS ELECTROSTATIC DEPOSITION AND ELECTRON BOMBARDMENT
POLYMERISATION OF GASEOUS ALPHA-BETA UNSATURATED MONOMERS
Filed Jan. 4, 1966
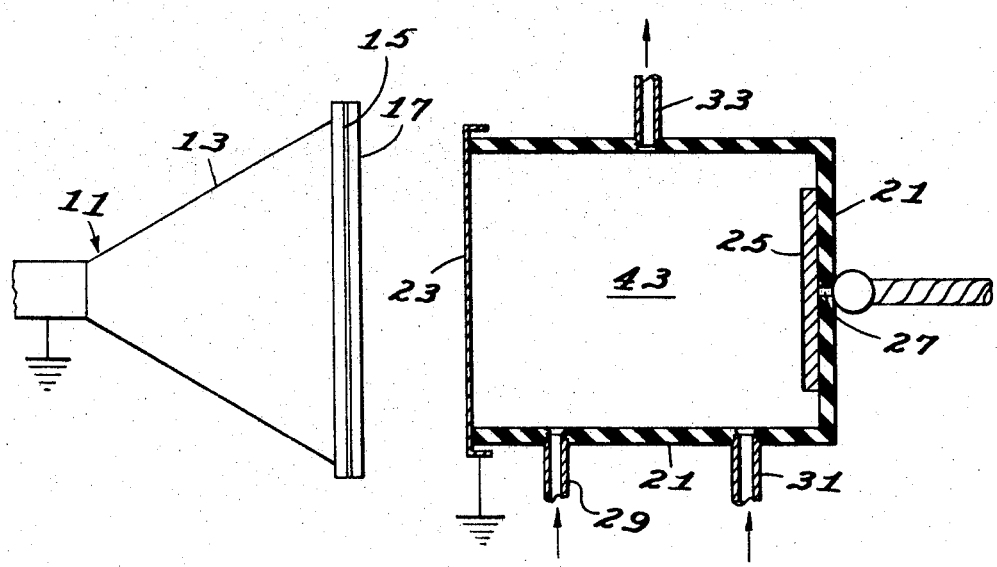
ALLEN H. TURNER
INVENTOR.
BY John R. Faulkner
Olin B. Johnson
ATTORNEYS

United States Patent Office

3,440,084
Patented Apr. 22, 1969

3,440,084
SIMULTANEOUS ELECTROSTATIC DEPOSITION AND ELECTRON BOMBARDMENT POLYMERISATION OF GASEOUS ALPHA-BETA UNSATURATED MONOMERS
Allen H. Turner, Ann Arbor, Mich., assignor to Ford Motor Company, Dearborn, Mich., a corporation of Delaware
Filed Jan. 4, 1966, Ser. No. 518,584
Int. Cl. B44c 1/04; B44d 1/18, 1/26
U.S. Cl. 117—93.31
11 Claims

ABSTRACT OF THE DISCLOSURE

A method is provided for coating an electrically-conductive object with a gaseous coating material and simultaneously curing such coating. A stream of the gaseous coating material is passed through an electric field extending between a first electrode and the object to be coated in an inert atmosphere and electrostatically deposited upon the object by an electron beam transmitted through such field transversely to said stream.

---

This invention relates to the art of coating. In particular, this invention relates to a method of coating wherein an organic coating material is vaporized, passed into an electron beam, and electrically charged units thereof are formed by electron collision therewith, and such units are electrostatically deposited upon an electrically-conductive object. In one embodiment, this invention is concerned with a method of coating wherein a radiation-curable, film-forming, liquid coating material is converted to a gaseous state, passed between an electron-emission source and an electrically-conductive workpiece, irradiated by an electron beam passed from said emission source, electrostatically deposited upon the surface of said object, and polymerized in situ thereon by energy of the beam.

The development of radiation-curable coating compositions, i.e. paints, varnishes, etc., has made possible important advances in the coating art which are exemplified by qualitative benefits in resultant coatings and by reductions in curing time and space requirements. Examples of radiation-curable, film-forming, coating materials which can be utilized without incorporating particulate solids such as mineral pigments are disclosed in the following copending U.S. patent applications: application Ser. No. 479,445 by William J. Burlant and Ivan H. Tsou, application Ser. No. 487,100 by William J. Burlant and Ivan H. Tsou, and application Ser. No. 496,187, now abandoned, by William J. Burlant, all assigned to the assignee of the present invention.

Radiation-induced polymerization of olefinically unsaturated compounds is disclosed in a number of U.S. patents of which the following are exemplary: Slatkin, U.S. Patent 3,133,828; Hughes et al. 3,132,966; Mesrobian 3,131,139; Kenaga 3,077,418; and Agruss 3,013,895.

Adhering a vinyl monomer to an organic polymeric solid by irradiating the solid while the latter is in contact with vapors of the monomer has been disclosed by Tanner in U. S. Patent 2,999,056.

In the instant process, units of a vaporized organic coating material upon entering an electron beam acquire negative electrical charge and are electrostatically deposited upon a workpiece constituting a positive electrode which forms one terminus of the electric field in which charging of the coating unit is initiated. Where the beam employed is also directed upon the workpiece so as to project electrons of polymerization-effecting energy to the surfaces receiving such deposit and the coating material comprises organic monomers and/or polymers having alpha-beta olefinic unsaturation, the electrostatically deposited coating material simultaneously undergoes curing through utilization of beam energy which initiates and/or completes polymerization of the deposit.

The terms "high-energy electrons" and "polymerization-effecting electrons" as employed herein refer to electrons having energy at least sufficient to ionize organic compounds or break chemical bonds, e.g. electrons having energy in excess of about 50,000 electron volts, advantageously in the range of about 100,000 to about 500,000 electron volts or higher, and preferably in the range of about 175,000 to about 375,000 electron volts.

A high-energy electron source may be provided by accelerating electrons to high energy in an evacuated tube, and permitting the high-energy electrons to issue from the tube through an electron window therein, ordinarily a thin metal sheet.

A variety of devices are disclosed in the literature which are adapted to transmit therefrom an electron beam suitable for use in the method of this invention. See, for example, the following U.S. patents: Lawton, 3,097,960; Schmitz et al. 2,921,006; Robinson 2,602,751 and 2,680,814; and Westendorf 2,144,518.

Referring to the accompanying schematic drawing, an electron accelerator 11 is shown spaced apart from a substantially enclosed coating chamber 43 and positioned so as to direct an electron beam issuing therefrom toward such chamber. In this view there are shown of the accelerator 11 only an exterior housing 13, an end view of a metal electron window 15, and a sealing bracket 17, all at ground potential. It will be understood that this invention is concerned with the use of the electron beam emanating from the electron accelerator and, hence, is not especially concerned with the details of its construction so long as it be operable for the hereinbefore and hereinafter described process. Conventionally, the housing of the emitter, or a chamber forming member therein in which both the cathode and anode elements are positioned, is substantially gas-evacuated by conventional conduit and pumping means, e.g. to an air pressure as low as about $10^{-5}$ mm. Hg, commonly about $2.5 \times 10^{-5}$ to about $5 \times 10^{-5}$ mm. Hg. One or more cathodes, e.g. tungsten wire filaments, are positioned within the evacuated housing and electrically connected to the negative terminal of a direct-current, high-voltage, electrical power source. The metal window 15 conventionally is at a more positive potential than the cathodes and comprises at least a part of the positive electrode of the emitter. Ordinarily, the window is in contact with a suitable support of conductive material such as a tubular member spaced apart from the cathode and extending from in front of the cathode to the window so as to provide an unimpeded path for electrons to pass from the cathode to the window. Two or more cathodes can be maintained at slightly different electrical potentials by conventional electrical control means so as to establish a current through these filaments when connection with the power source is established. When a single continuous filament is employed such current can be induced with a low voltage transformer unit such as that disclosed in my copending patent application, Electron Induced Deposition of Organic Coatings, Ser. No. 518,695 filed of even date with this application.

In one such device, electrons are accelerated as a narrow beam within the evacuated tube, and then a rapid scanning movement is imparted to the electron beam before it passes through the electron window and issues from the tube. In another such device, an electron beam is focused into sheet form within the tube by a system of cylindrical electron optics. Where precise focusing is not essential, the electron-emitting cathode or cathodes may simply be partially enclosed in a suitable housing within the tube which restricts and directs the electron beam to the electron window.

Coating chamber 43 is substantially enclosed by housing 21 and electron window 23. Housing 21 is formed of any suitable non-conductor, e.g. wood, glass, plastic. Electron windows 15 and 23 are formed of any of the materials conventionally used for such windows in conventional electron accelerators. Ordinarily, these are thin metallic sheets formed from a suitable light metal or alloy, e.g. aluminum, lithium, titanium, beryllium, aluminum and copper, aluminum and beryllium, magnesium and thorium, etc. Also inside coating chamber 43 is an electrically-conductive workpiece 25. Workpiece 25 is an electrical connection with conductor 27 which in turn is in electrical connection with the positive terminal of a direct-current electric power source, not shown. Window 23 is at ground potential. In one embodiment, window 23 is removed, accelerator 11 is brought to the edge of coating chamber 43 with window 15 serving both as the electron exit window for eccelerator 11 and the electron entrance window for coating chamber 43. Chamber 43 is also provided with inlet conduits 29 and 31 and outlet conduit 33. Inlet conduit 31 provides inlet means for admitting vapors of the coating material to the coating zone. Inlet conduit 29 provides inlet means for introducing a suitable inert gas such as nitrogen, helium, etc. Certain coating materials polymerize more readily in the absence of oxygen. A light gas such as helium serves the further purpose of reducing the electron energy loss with distance which is approximately 8,000 electron volts per inch in air. In a preferred embodiment, workpiece 25 is movable on conventional conveyor means, not shown, across the path of the electron beam. In such case, inlet and outlet openings for the workpiece are provided in the sides of housing 21.

It is believed that the charging of vapor units of the coating material results from the attachment, capture or other close association of an electron or electrons from the beam by a neutral molecule of the coating material. See, for example, Theory of Gaseous Conduction and Electronics, Maxfield and Benedict, 1941, McGraw-Hill Publishing Co., New York, N.Y. and London, England, pp. 246–247. However, it is not intended to limit this invention to any specific theory of charge acquistion resulting from exposure of the coating material to the beam.

It is not required that the exterior of the electron accelerator be at ground potential or that the workpiece be positively charged in relation to ground. It is necessary that the workpiece be of such potential that it constitutes a positive electrode which forms one terminus of the requisite electric field within which charging of the coating unit is effected. Thus, a suitable difference of potential may exist between the accelerator and the workpiece as in the embodiment described in the drawing, the exterior of the accelerator may be at a suitably negative potential with respect to ground with the workpiece at ground potential, or a separate and spaced apart electrode may be employed to create the electric field within which the vapor units will move to the workpiece upon acquiring negative charge from electron bombardment.

The invention will be more fully understood from the following operative example:

*Example 1*

Employing equipment of the type illustrated in the accompanying drawing and heretofore described in this specification, styrene was heated to vaporization and the vapors emanating from the styrene container were admitted to coating chamber 43 via conduit 31 while helium was admitted to coating chamber 43 via conduit 29. Mixed gases exited overhead from chamber 43 via conduit 33. The styrene monomer was heated to about 275° F. to obtain a partial pressure of about 1 mm. Hg in chamber 43. The primary electron beam current, i.e. the current entering chamber 43, was about 2 milliamperes provided at a potential of about 270,000 electron volts. The workpiece was positive with respect to ground, i.e. 2,000 volts positive, and the current drawn by the workpiece was about 4.3 milliamperes. The increase in current is due to ionization of gas molecules within chamber 43. A film of 0.8 mil average thickness was produced on the workpiece 25 after about 15 minutes of such operation. Analysis of the film established the same to be polystyrene. Examination of the inner surface of window 23 revealed that only a few separated droplets of the coating material had deposited thereon. In excess of about 95% of the styrene vapor deposited inside chamber 43 had deposited and polymerized on workpiece 25.

In one preferred embodiment the zone between the electron emission source and the object to be coated has a plurality of inlet and outlet means and a curtain or stream of an inert gas offering less resistance to electron transmission than air is passed between the electron emitter and the zone occupied by or through which passes the vaporized coating material. In another preferred embodiment a curtain or stream of such inert gas is passed through a zone between the object to be coated and the zone occupied by or through which passes the vaporized coating material. Helium gas is preferred for use as the inert gas in each of the foregoing embodiments.

Where the process is concerned only with electrostatic deposition of the coating material, paints and other coating materials may be used which are not suitable for radiation curing.

I claim:
1. The method of electrostatically depositing a film-forming, organic coating material upon an electrically-conductive object which comprises providing an electric field extending between a first electrode and said object in an inert atmosphere offering a lower resistance to electron transmission than air with said object constituting a positive electrode which forms one terminus of said field, passing a stream of said coating material in gaseous state across said field and into a contact zone within said field between said first electrode and said object, transmitting a beam of electrons into said contact zone in transverse relationship to said stream and electrostatically depositing units of said gaseous coating material upon said object by contacting said units with said electron beam, said beam having average energy above about 50,000 electron volts and sufficient to induce an electrical charge upon at least a substantial number of said units that is negative with respect to said object, at the time of charge aquisition the distance between said object and at least a substantial number of the resultant charge-bearing units of said coating material being within the range wherein the electrical forces of attraction between the negatively charged units and said object are greater than the sum of all opposing forces acting upon said negatively charged units.

2. The method of claim 1 wherein said beam of electrons is transmitted from said first electrode.

3. The method of claim 1 wherein said electrons upon contacting said units have average electrical energy in the range of about 100,000 to about 500,000 electron volts.

4. The method of claim 1 wherein the amtopshere within said field consists essentially of said coating material and helium and the average energy of said electrons upon entering said field is in the range of about 175,000 and about 375,000 electron volts.

5. The method of claim 1 wherein a zone of inert gas offering a lower resistance to electron transmission than air is interposed between said contact zone and said object.

6. The method of claim 1 wherein said beam of electrons is transmitted from said first electrode and a zone of inert gas offering a lower resistance to electron transmission than air is interposed between said first electrode and said contact zone.

7. The method of coating an electrically-conductive object which comprises providing an electric field extending between a first electrode and said object in an inert atmosphere offering a lower resistance to electron transmission than air with said object constituting a positive electrode which forms one terminus of said field, passing a stream of a film-forming, organic coating material having alpha-beta olefinic unsaturation in gaseous state across said field and into a contact zone within said field between said first electrode and said object, electrostatically depositing units of said gaseous coating material upon said object by transmitting a beam of electrons into said contact zone in transverse relationship to said stream, said electrons upon contacting said units having average energy above about 50,000 electron volts and sufficient to induce an electrical charge upon at least a substantial number of said units that is negative with respect to said object, at the time of charge acquisition the distance between said object and at least a substantial number of the resultant charge-bearing units of said coating material being within the range wherein the electrical forces of attraction between the negatively charged units and said object are greater than the sum of all opposing forces acting upon said negatively charged units, and simultaneously contacting the area of resultant deposit upon said object with a beam of polymerization-effecting electrons, said object being movable across the path of said beam of polymerization-effecting electrons.

8. The method of claim 7 wherein the electron beam transmitted into said contact zone and the electron beam contacting said object are the same beam.

9. The method of claim 7 wherein the electron beam transmitted into said contact zone issues from said first electrode.

10. The method of claim 7 wherein the electron beam contacting said object issued from said first electrode.

11. The method of claim 7 wherein the electrons of the electron beam transmitted into said contact zone and the electrons of the electron beam contacting said object each have average energy in the range of about 100,000 to about 500,000 electron volts.

References Cited

UNITED STATES PATENTS 3,113,896 12/1963 Mann _____ 117—93.31
3,132,966 5/1964 Hughes et al. _____ 117—93.31

ALFRED L. LEAVITT, *Primary Examiner.*

J. H. NEWSOME, *Assistant Examiner.*

U.S. Cl. X.R.

117—93.4; 204—159.22, 170